United States Patent [19]

Eiswirth et al.

[11] Patent Number: 4,847,447

[45] Date of Patent: Jul. 11, 1989

[54] PROTECTIVE DEVICE FOR A CABLE END

[75] Inventors: Peter Eiswirth; Michael Lehnert, both of Heidelberg, Fed. Rep. of Germany

[73] Assignee: Heidelberger Druckmaschinen AG, Heidelberg, Fed. Rep. of Germany

[21] Appl. No.: 206,223

[22] Filed: Jun. 13, 1988

[30] Foreign Application Priority Data

Jun. 11, 1987 [DE] Fed. Rep. of Germany ... 8708258[U]

[51] Int. Cl.⁴ .......................................... H02G 15/06
[52] U.S. Cl. .................................... 174/74 A; 174/60; 174/79; 174/138 F
[58] Field of Search ..................... 174/74 R, 74 A, 60, 174/79, 138 F; 439/135, 149, 447

[56] References Cited

U.S. PATENT DOCUMENTS

| 286,963 | 10/1883 | Reed | 174/74 A |
|---|---|---|---|
| 724,383 | 3/1903 | Donaldson | 174/87 |
| 905,349 | 12/1908 | Neal et al. | 174/74 A |
| 2,677,009 | 4/1954 | Mascuch | 174/74 A |
| 3,285,548 | 11/1966 | Matto et al. | 174/138 F |
| 3,354,454 | 11/1967 | Rueger | 174/60 |
| 3,710,003 | 1/1973 | Channell | 174/60 X |
| 4,194,082 | 3/1980 | Campbell | 174/74 A |
| 4,221,924 | 9/1980 | Gabriel et al. | 174/74 A X |
| 4,245,134 | 1/1981 | Oldham et al. | 174/705 |
| 4,737,600 | 4/1988 | Mathis et al. | 174/74 A X |

FOREIGN PATENT DOCUMENTS

| 0120541 | 10/1984 | European Pat. Off. . | |
|---|---|---|---|
| 2525964 | 12/1976 | Fed. Rep. of Germany . | |
| 2638459 | 3/1978 | Fed. Rep. of Germany ... | 174/74 A |
| 3322104 | 12/1983 | Fed. Rep. of Germany . | |
| 3417538 | 11/1985 | Fed. Rep. of Germany . | |
| 781137 | 8/1957 | United Kingdom . | |

Primary Examiner—Morris H. Nimmo
Attorney, Agent, or Firm—Herbert L. Lerner; Laurence A. Greenberg

[57] ABSTRACT

Protective device for a cable end for use when laying a cable includes a rigid and elongated sleeve closed at one end thereof and having a cable end disposed therein.

5 Claims, 1 Drawing Sheet

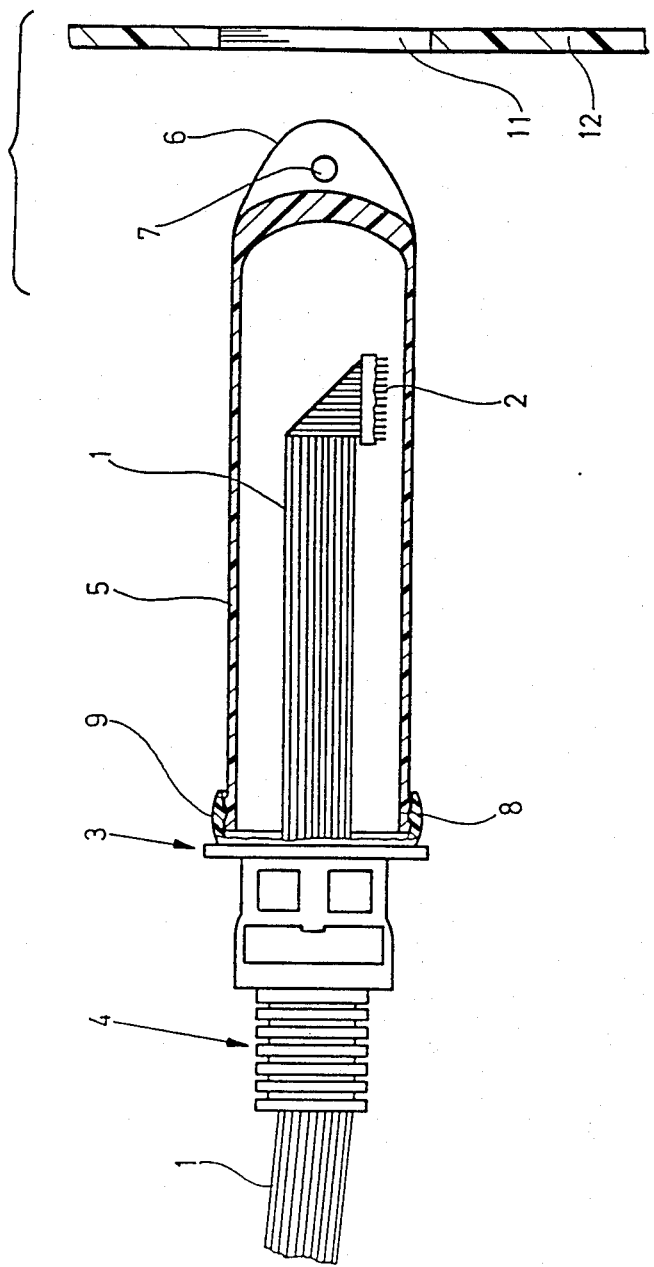

PROTECTIVE DEVICE FOR A CABLE END

The invention relates to a protective device for a cable end for use when laying a cable, the cable end being open or provided with a plug connector.

It is generally known to provide an apparatus or machine having electric devices with prefabricated cables which must be led to given cable connection or junction boxes or the like. When such cables are laid, the danger often arises that the plug connectors provided on the cable and the free cable ends, respectively, may become damaged or soiled. This disadvantage has been countered heretofore by wrapping the cable ends with a suitable plastic band or by covering the plug connectors. In doing so, the connection between the cable and the plug connector was subjected to very high loads and, moreover, the guidance of the cable through narrow cable ducts was impeded due to the protective measures.

It is therefore an object of the invention to provide a protective device for a cable end which, without the aforementioned disadvantages, protects the end of the cable and a plug connector attached thereto, respectively, when the cable is being laid and assembled, respectively, which facilitates the laying as such. With the foregoing and other objects in view, there is provided, in accordance with the invention, a protective device for a cable end for use when laying a cable, comprising a rigid and elongated sleeve closed at one end thereof and having a cable end and/or a plug connector secured to the cable end disposed therein.

A considerable advantage of such a construction is the very simple and easy handling or manipulation of the cable end which results therefrom, the sleeve being viewed as a laying aid especially for laying the cable through cable pass-throughs such as grommets.

In accordance with another feature of the invention, the cable is a flat cable, and the plug connector extends in the sleeve in a direction substantially transverse to a direction of connection of the plug connector. Thus, when a flat cable is used, the relatively wide plug connector provided on the flat cable is introduced into the sleeve by making a transverse fold in the flat cable so that a relatively narrow side of the plug connector is insertable first; the sleeve thereby requires only a relatively small diameter even when the plug connector is a multicontact connector.

In order to facilitate the laying of the cable in narrow cable ducts, there is provided, in accordance with a further feature of the invention, a protective device of the foregoing type, wherein the sleeve is formed with a rounded dome at the closed end thereof and has an eye thereat for fastening to the sleeve pull means such as a wire or the like which is passed through the eye and serves for pulling the cable through cable ducts.

If the cable end is to be introduced or led into a connection or junction box, in accordance with an added feature of the invention, the protective device is provided with a connecting member disposed on the cable end, the sleeve being detachably fastened to the connecting member, and the connecting member being engageable with the connection box so as to close the cable pass-through formed therein. The connecting member thus serves to secure or fix the sleeve i.e. the sleeve is snapped, screwed or otherwise stuck onto the connecting member, where it remains until the cable laying has been completed. After completion of the cable laying, the sleeve can be removed from the connecting member and the cable can be connected.

The connecting member is advantageously constructed, moreover, in accordance with a concomitant feature of the invention, so that it closes dust-free the cable pass-through, such as a grommet, formed in the connection box, and connects the cable to the connection box mechanically e.g. by means of a snap connection. Other features which are considered as characteristic for the invention are set forth in the appended claims.

Although the invention is illustrated and described herein as embodied in a protective device for a cable end, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single figure of the drawing which is a longitudinal sectional view of the protective device for a cable end in accordance with the invention shown connected to the end of a cable.

The invention is explained hereinafter in detail with reference to the embodiment illustrated in the FIGURE of the drawing. The FIGURE shows a flat cable 1 having at an end thereof a plug connector 2 suitable for flat cables, which has an elongated structure and is of generally conventional construction. The flat cable 1 is passed through a connecting member 3 having a protective hose 4 attached thereto and is either cast in the connecting member 3 or secured in the connecting member 3 by a conventional clamp connection or the like. Such cables are required, for example, for electrically wiring machines or installations and are laid in cable chutes or ducts extending to a junction or connection box.

To protect the plug connector 2 and the cable end during the assembly and laying of the cable, respectively, a sleeve 5 is proivded which is formed, for example, of plastic material, and is slipped over the cable end and stuck onto the connecting member 3. The connecting member 3 and the sleeve 5 are provided with suitable connecting elements 8 such as bead-shaped or toroidal prominences and depressions, for example, so that the sleeve 5 can be easily stuck onto the connecting member 3 and can be removed again therefrom yet, on the other hand, this connection is so reliable that, during the assembly, the sleeve 5 cannot be detached from the connecting member 3. The sleeve 5 is provided at a closed end thereof with a rounded head or dome 6 and is furthermore formed with an eye 7 thereat. The rounded head or dome 6 facilitates the insertion of the sleeve 5 into bores or cable chutes or ducts, and the cable is able to be pulled through cable chutes or ducts by means of the eye 7. When the cable laying has been completed, the cable end is inserted into a switch cabinet of which a wall 12 is partially illustrated in the drawing. The wall 12 is formed with a bore 11 which is so shaped that the connecting member 3, which is formed with the bead 9, catches or locks therein, thereby closing the bore dust-tightly. After the connecting member 3 has been secured in the bore 11, the sleeve 5 can be removed and the plug connector 2 can be plugged into the respective receptacle.

Neither the attachment of the sleeve 5 to the connecting member 3 and the securing of the connecting member 3 in the bore 11 requires any tool and can be performed in a relatively simple manner. If the cable 1, which may obviously also be a round cable, is not provided with a connecting member 3, it is possible also to connect the sleeve 5 directly to the cable 1 so that is is readily detachable, for example, by means of suitable conventional clamping elements. In this case, as well, the cable end and a plug connector which might be provided thereon are protected and the cable laying is facilitated due to the relatively simple manipulation or handling of the sleeve 5. Of course, the sleeve 5 also provides effective protection against damage or soiling while the cable 1 is being transported.

We claim:

1. In combination, a cable, a housing having a wall formed with a bore wherein the cable is secured and a protective device for an end of the cable for use when laying the cable, comprising a rigid and elongated sleeve closed at one end thereof and having the cable end disposed therein, and a connecting member mounted on the cable end, said connecting member having means for securing the cable in said bore and for dust-tightly closing said bore.

2. The combination of claim 1, including a plug connector secured to the cable end and disposed in said sleeve.

3. The combination of claim 2, wherein the cable is a flat cable, and said plug connector extends in said sleeve in a direction substantially transverse to a direction of connection of said plug connector.

4. The combination of claim 1, wherein said sleeve is formed with a rounded dome at said closed end thereof and has an eye thereat for fastening pull means to said sleeve.

5. The combination of claim 1, wherein said sleeve is detachably fastened to said connecting member.

* * * * *